(12) United States Patent
Tsunehara et al.

(10) Patent No.: US 6,208,921 B1
(45) Date of Patent: Mar. 27, 2001

(54) VEHICLE BEHAVIOR CONTROL SYSTEM

(75) Inventors: Hiroshi Tsunehara; Yoshiki Yasuno, both of Kanagawa; Kensuke Fukuyama, Yokohama, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/060,074

(22) Filed: Apr. 15, 1998

(30) Foreign Application Priority Data

Apr. 16, 1997 (JP) ................................................ 9-099020

(51) Int. Cl.⁷ .............................................. B62D 5/06
(52) U.S. Cl. .............................. 701/41; 180/142; 180/141
(58) Field of Search ..................... 701/41, 42; 180/143, 180/141, 140, 142, 79.1

(56) References Cited

U.S. PATENT DOCUMENTS 5,065,323 * 11/1991 Shiraishi et al. ........................ 701/41

FOREIGN PATENT DOCUMENTS

| 5-310141 | 11/1993 | (JP) . |
| 6-219300 | 8/1994 | (JP) . |

* cited by examiner

*Primary Examiner*—William A. Cuchlinski, Jr.
*Assistant Examiner*—Arthur D. Donnelly
(74) *Attorney, Agent, or Firm*—Foley & Lardner (57) ABSTRACT

A vehicle behavior control system comprises a controller for determining a sensed steering angle from a steering amount signal and a neutral detection signal from a steering angle sensor, and performs a behavior control operation to reduce a deviation of a sensed actual motion variable such as a vehicle yaw rate from a target motion variable determined from the sensed steering angle. When the neutral detection signal is not available just after a start of the engine, the controller determines the target motion variable from an estimated steering angle instead of the sensed steering angle, and immediately starts controlling the vehicle behavior without delay by, for example, controlling the braking forces of the individual wheels.

15 Claims, 6 Drawing Sheets

VEHICLE BEHAVIOR CONTROL SYSTEM

The contents of a Japanese Patent Application No. 9-99020 with a filing date of Apr. 16, 1997 are hereby incorporated by reference.

BACKGROUND OF THE INVENTION

The present invention relates to a vehicle behavior control system, such as a yaw rate control system, for controlling behavior of a vehicle, and more specifically to a vehicle behavior control system devised to provide adequate control performance just after a start of the system.

A Japanese Patent Provisional (Kokai) Publication No. 6(1994)-219300 discloses a conventional vehicle behavior control system for controlling the vehicle behavior by varying a rear wheel steer angle with an electric motor. From turn-on of the ignition switch until detection of the neutral steering position, this control system is unable to determine the steering wheel angle relative to the neutral position, and the behavior control based on the steering angle remains inaccurate, incurring the possibility of unwanted rear wheel steering operation. Therefore, the behavior control by the rear wheel steering is not initiated until the vehicle is brought to a neutral state in which the neutral position of the steering wheel can be detected, the rear wheel steering position is around the neutral position, and the target value of the rear wheel steer angle is in a neutral region.

A Japanese Patent Provisional (Kokai) Publication No. 5(1993)-310141 shows another behavior control system. When the neutral signal representing the neutral position of the steering wheel is not available, this system controls the rear wheel steer angle by determining a target rear wheel steer angle from a vehicle speed and a sensed yaw rate without using the steering wheel angle as input information.

When the vehicle is started from the resting state with the steering wheel turned away from the neutral position, the former control system must defer a start of the behavior control until the steering wheel is returned to the neutral position. In the latter system using the sensed yaw rate to determine the target motion variable, calculation of the target behavior causes a response delay, and tends to incur hunting in the behavior control.

Some problems can be solved by a high accuracy absolute steering angle sensor. However, such a sensor is costly.

SUMMARY OF THE INVENTION

It is an object of the present invention to provide a vehicle behavior control system which can prevent undesired delay and hunting.

According to the present invention, a control system is arranged to control behavior of a vehicle in accordance with a deviation of an sensed motion variable indicative of the behavior of the vehicle, from a target motion variable which is determined from a sensed steering angle with respect to a neutral steering position of a steering wheel. The control system comprises at least a control section for determining the target motion variable from an estimated steering angle in lieu of the sensed steering angle in a state in which the neutral steering position is not detected, and determination of the steering angle based on the neutral position is not feasible.

By using the estimated steering angle, the control system can start the behavior control immediately after a turn-on of an ignition switch of the vehicle, without waiting for a return to the neutral, and without using the sensed behavior. Therefore, the control system can prevent response delay, and hunting.

DETAILED DESCRIPTION OF THE INVENTION

Figure 1:
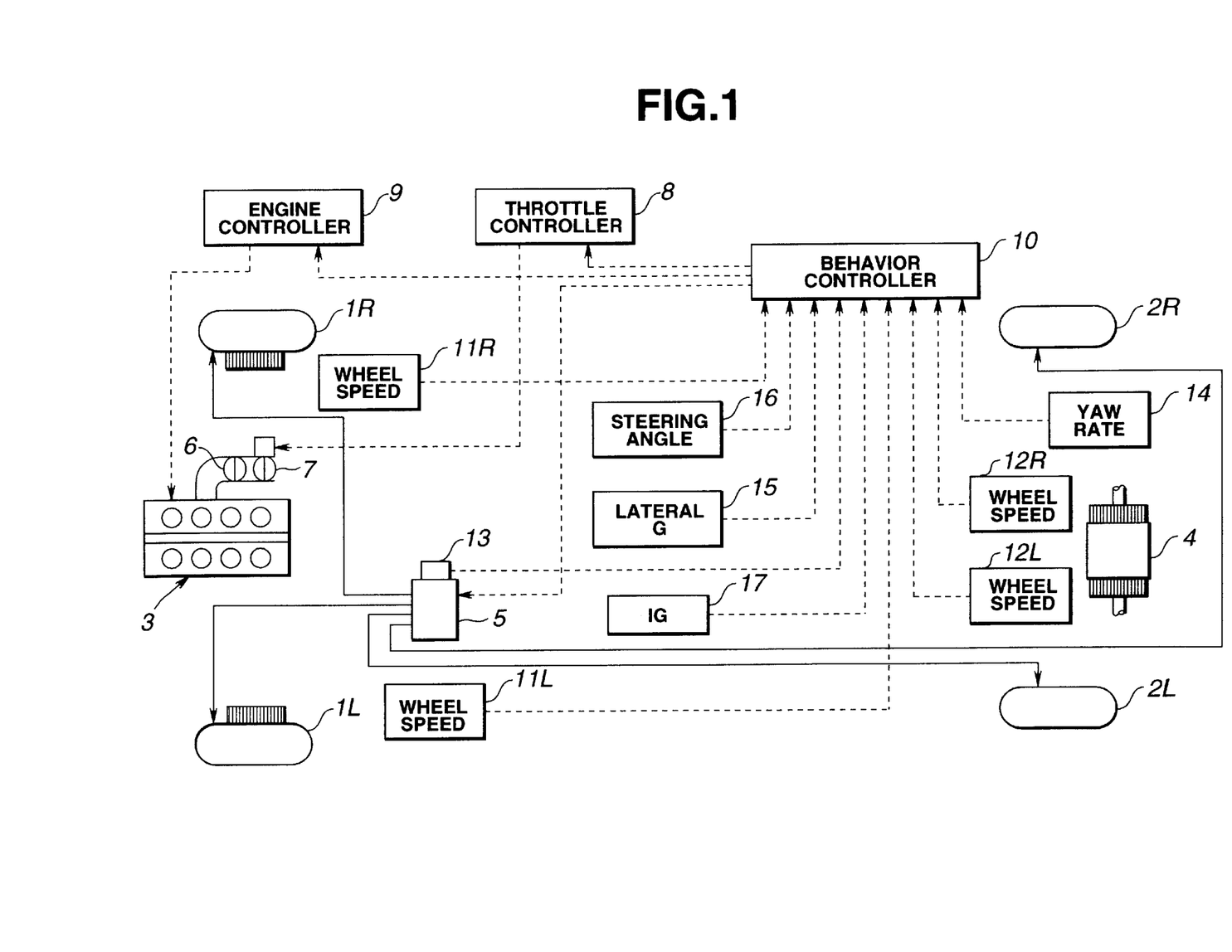
FIG. 1 is a schematic view showing a vehicle behavior control system according to one embodiment of the present invention.

FIG. 1 schematically shows a motor vehicle having a vehicle control system according to one embodiment of the present invention. The control system of this example includes an engine control system and a brake control system.

The vehicle of FIG. 1 has left and right front wheels 1L and 1R and left and right rear wheels 2L and 2R, and a drive system for transmitting power from an engine 3 to the left and right rear wheels 2L and 2R through a transmission (omitted in FIG. 1 for simplification) and a differential gear unit 4.

A brake system of the vehicle in the example shown in FIG. 1 includes a hydraulic brake actuator 5 for individually controlling brake fluid pressures delivered through brake lines to four wheel cylinders (omitted in FIG. 1) each provided to a unique one of the four wheels 1L, 1R, 2L and 2R. The brake system of this example can produce a left and right braking force difference by controlling the individual brake pressures, and thereby control behavior of the vehicle. The brake system of this example is further capable of performing antilock (or antiskid) brake control to prevent locking of each wheel during braking.

The engine system includes a main throttle valve 6 and a sub throttle valve 7. The main throttle valve 6 is connected with an accelerator pedal so that the main throttle valve 6 is operated in accordance with a driver's accelerator input. The sub throttle valve 7 is a normally open type valve disposed in series with the main throttle valve 6 in an intake air passage. A throttle controller 8 can perform a traction control operation to prevent drive wheel slip of the rear wheels 2L and 2R by decreasing the opening of the sub throttle valve 7 and thereby reducing the engine output. An engine controller 9 can cut off the supply of fuel to the engine 3 selectively by stopping the fuel injection temporarily, and reduce the engine output. By the fuel cutoff control, the engine controller 9 can perform a traction control operation to prevent the drive wheel slippage.

A behavior controller 10 controls the brake actuator 5, the throttle controller 8 and the engine controller 8 by producing respective control signals sent to these components in accordance with input information. The behavior controller 10 receives signals from an input section for collecting the input information on various operating conditions of the vehicle.

The input section of the control system of this example includes at least the following sensors.

A wheel speed sensor group supplies information on wheel speeds of the four wheels to the behavior controller 10. The wheel speed sensor group consists of left and right front wheel speed sensors 11L and 11R for sensing the peripheral speeds of the front wheels 1L and 1R, respectively, and left and right rear wheel speed sensors 12L and 12R for sensing the peripheral speeds of the rear wheels 2L and 2R, respectively.

A brake pressure sensor 13 senses a brake pressure.

A yaw rate sensor 14 senses a yaw rate of the vehicle. In this example, the yaw rate is a first motion variable indicative of the behavior of the vehicle.

A lateral G sensor 15 senses a lateral acceleration of the vehicle. In this example, the lateral acceleration is a second motion variable indicative of the behavior of the vehicle.

A steering angle sensor 16 senses a steering angle of the vehicle which, in this example, is a steering wheel angle of a steering wheel of the vehicle.

All these sensors of the input section sends respective sensor signals to the behavior controller 10.

The steering angle sensor 16 of this example has a construction substantially identical to the construction of a steering angle sensor disclosed in the Japanese Patent Provisional (Kokai) Publication No. 6(1994)-219300. The steering angle sensor 16 comprises a first sensing section for detecting a straight ahead neutral position of the steering wheel with a photoelectric sensing element and producing a neutral detection signal indicating that the steering wheel is in the straight ahead neutral position, and a second sensing section for producing a steering amount signal indicating an amount of rotation (or angular displacement) of the steering wheel. In this example, the steering amount signal is a pulse signal indicating the angular displacement of the steering wheel by the number of pulses.

From the signals from the steering angle sensor 16, the behavior controller 10 calculates the steering angle in the following manner. When the neutral detection signal is first generated after a turn-on of an ignition switch 17, the behavior controller 10 starts counting pulses of the pulse signal of the steering angle sensor 16 in up and down directions. Namely, from the time of detection of the neutral steering position at which the neutral detection signal is first generated after the turn-on of the ignition switch, the behavior controller 10 starts counting pulses of the pulse signal of the steering angle sensor 16 in the up direction increasing the count or in the down direction decreasing the count. By so doing, the behavior controller 10 determines the current steering angle relative to the neutral position by the cumulative count resulting from the pulse counting.

In accordance with the input information collected by the input section, the behavior controller 10 controls the behavior (such as the yaw rate) of the vehicle toward a desired target by controlling the individual brake fluid pressures to the wheels with the hydraulic brake actuator 5. The behavior controller 10 further performs the antilock brake control to prevent the wheel locking by controlling the individual brake fluid pressures, and the traction control to prevent the drive wheel slip by decreasing the opening of the sub throttle valve 7 through the throttle controller 8, and by cutting off the fuel supply through the engine controller 9.

Figure 2:
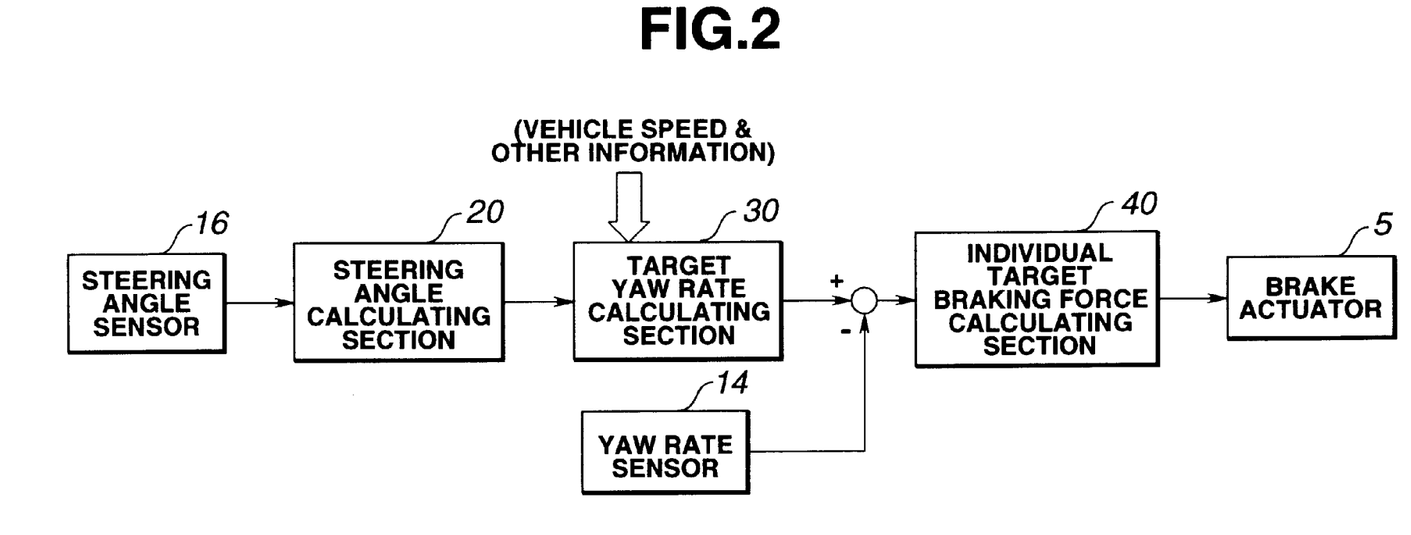
FIG. 2 is a functional block diagram of the vehicle behavior control system of FIG. 1.

FIG. 2 shows the behavior control system of this embodiment in the form of a functional block diagram.

Figure 3:
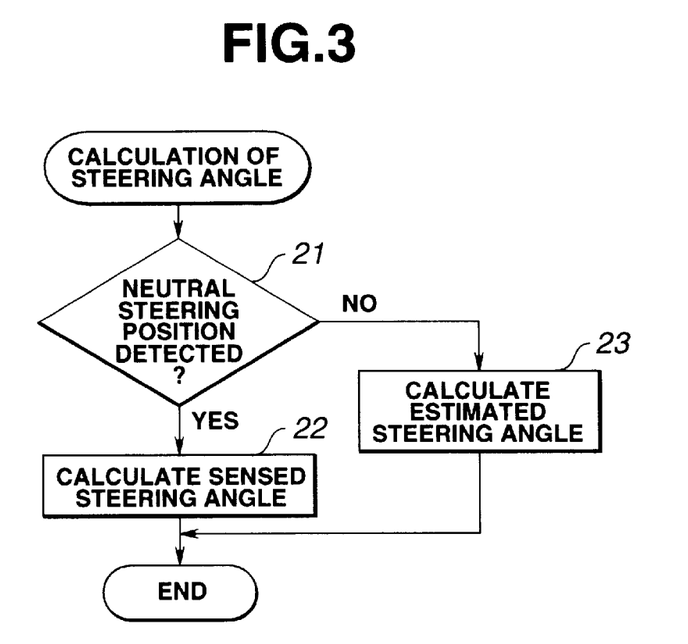
FIG. 3 is a flowchart showing a procedure performed by a steering angle calculating section shown in FIG. 2.

A steering angle calculating section 20 calculates the steering angle from the input information supplied from the steering angle sensor 16 by a procedure shown in FIG. 3.

At a step 21, the steering angle calculating section 20 determines whether the detection of the neutral position is complete by checking whether the neutral detection signal is already received from the steering angle sensor 16 after a turn-on of the ignition switch 17.

When the neutral position detecting operation is already finished at least once after the most recent turn-on of the ignition switch 17, the calculating section 20 calculates the sensed steering angle at a step 22, from the cumulative pulse count resulting from counting pulses from the steering angle sensor 16 in the up and down directions from the time of the most recent detection of the neutral steering position. The cumulative count of pulses from the time of neutral detection represents the angular displacement of the steering wheel from the neutral position in the left or right direction, or the steering angle between the current steering position and the neutral steering position. From the cumulative pulse count, the steering angle calculating section 20 can determine the sensed steering angle which is the angular displacement of the steering wheel measured in the left or right steering direction from the straight ahead neutral position.

When the neutral detection signal is not yet received from the steering angle sensor 16 after the turn-on of the ignition switch 17, and the neutral position detection is judged to be unfinished, the steering angle calculating section 20 determines an estimated steering angle at a step 23, instead of the sensed steering angle. In this example, the estimated steering angle is calculated as shown in FIG. 4.

Figure 4:
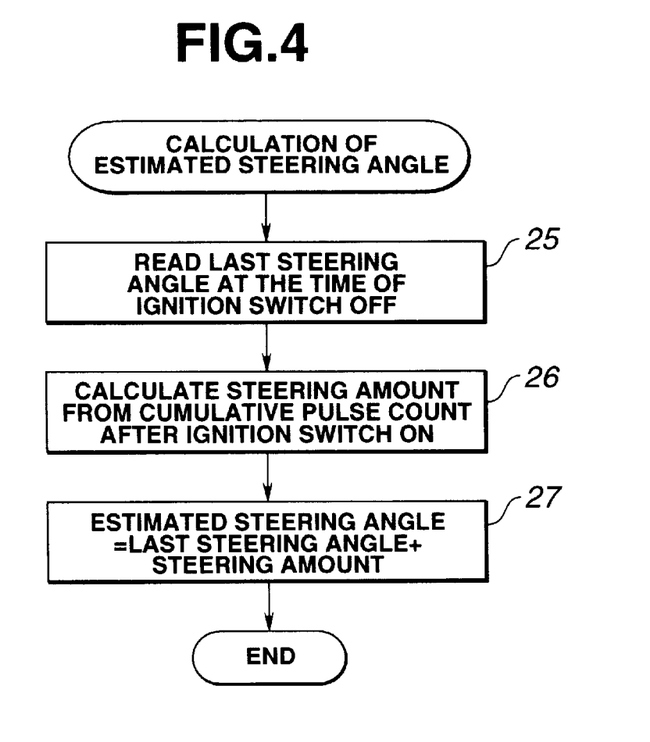
FIG. 4 is a flowchart showing a procedure of the steering angle calculating section for determining an estimated steering angle.

At a step 25 of FIG. 4, the steering angle calculating section 20 reads a last steering angle stored in a memory section. The last steering angle is a value of the sensed steering angle at the time of a turn-off of the ignition switch 17. Each time the ignition switch 17 is turned off, the behavior controller 10 stores the then-existing most recent value of the sensed steering angle as the last steering angle in the memory section which is external or internal to the controller 10.

At a step 26, the steering angle calculating section 20 determines a steering amount of the steering wheel after the turn-on of the ignition switch 17 from the cumulative pulse count obtained by counting pulses received from the steering angle sensor 16 after the ignition turn on. The thus-determined steering amount is the angular distance from the steering position of the steering wheel at the time of the turn-on of the ignition switch 17 to the current position of the steering wheel.

Then, at a step 27, the steering angle calculating section 20 determines the current estimated steering angle relative to the neutral position by addition of the stored last steering angle and the steering amount after the ignition turn-on.

Alternatively, it is possible to determine the estimated steering angle from one of the yaw rate sensed by the yaw rate sensor 14, the lateral acceleration sensed by the lateral acceleration sensor 15, and a left and right wheel speed difference between the left wheel speed and right wheel speed sensed by the wheel speed sensors 11L, 11R, 12L and 12R.

A target yaw rate calculating section 30 shown in FIG. 2 determines a desired target yaw rate according to a known mathematical relationship by using the sensed or estimated steering angle calculated by the procedure of FIGS. 3 and 4, and other information such as the vehicle speed determined from the signals of the wheel speed sensors 11L, 11R, 12L and 12R.

The target yaw rate (target motion variable) is used as a standard for a yaw rate deviation of the actual yaw rate (actual motion variable) sensed by the yaw rate sensor 14.

Figure 5:
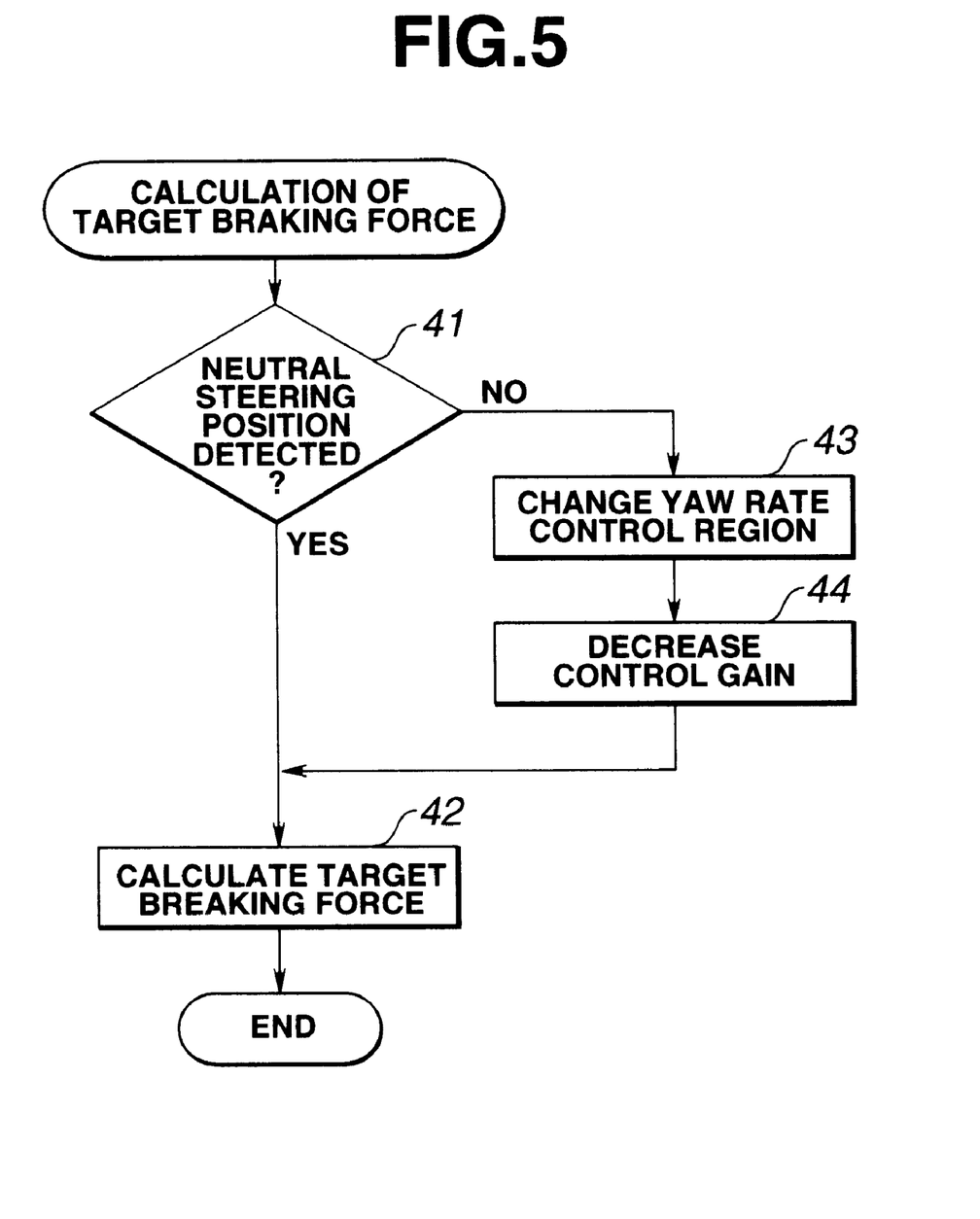
FIG. 5 is a flowchart showing a procedure performed by a target braking force calculating section shown in FIG. 2.

A target braking force calculating section 40 of FIG. 2 calculates a target braking force of each wheel required to reduce the yaw rate deviation of the sensed actual yaw rate from the target yaw rate toward zero, according to a process shown in FIG. 5.

At a step 41, the target braking force calculating section 40 performs a judging operation similar to the step 21 of FIG. 3. The braking force calculating section 40 determines whether the detection of the neutral position is complete, by checking whether the neutral detection signal is already received after a turn-on of the ignition switch 17.

When the neutral detection is already finished, that is when the target yaw rate calculating section 30 calculates the target yaw rate by using the sensed steering angle obtained at the step 22, the braking force calculating section 30 proceeds from the step 41 to a step 42 to determine the target braking force of each wheel.

Figure 7:
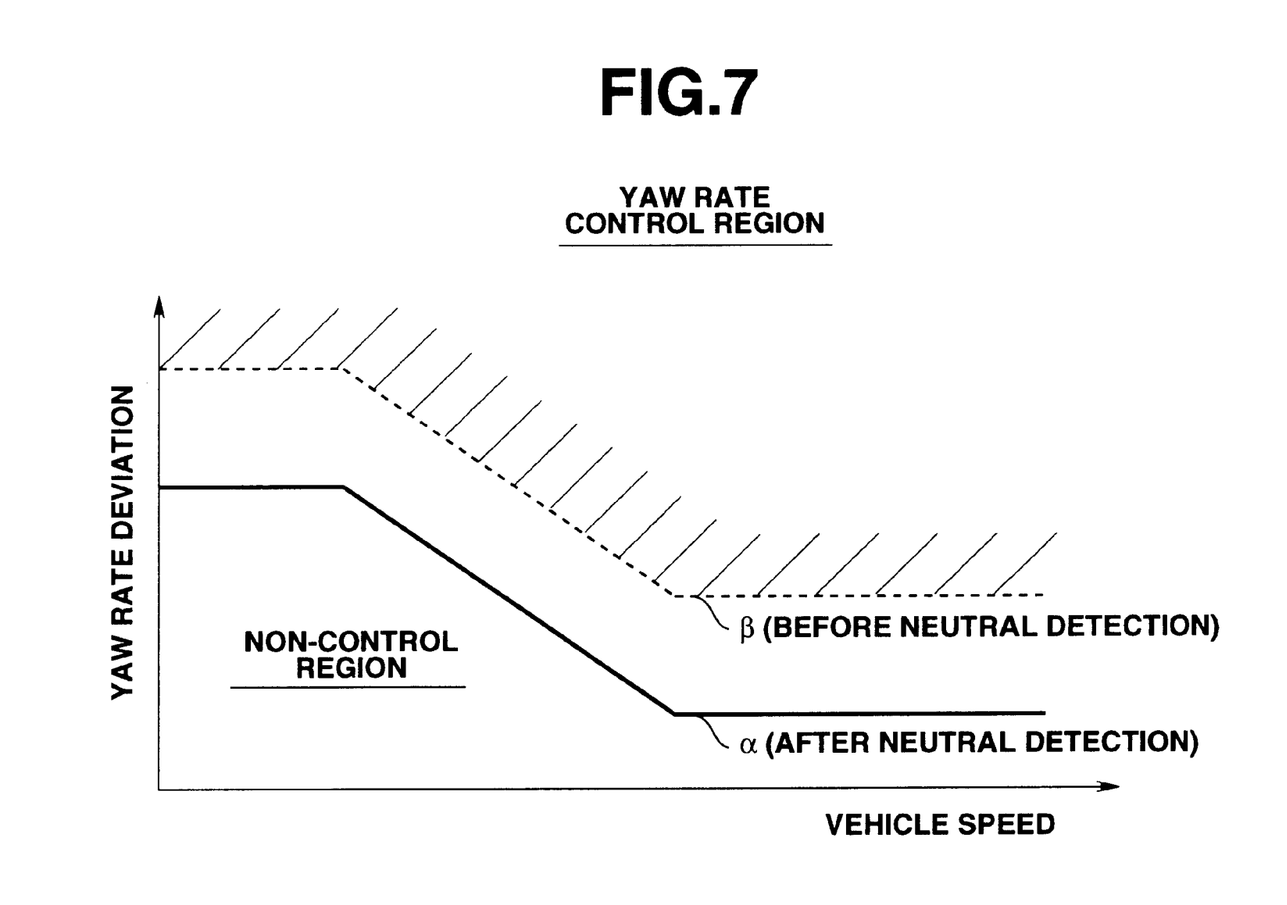
FIG. 7 is a graph showing a yaw rate control region modified at a step 43 of FIG. 5.

At the step 42, the target braking force calculating section 40 calculates the target braking force for each wheel to cause the actual yaw rate to approach the target yaw rate with a predetermined control gain when the yaw rate deviation is greater than a deviation threshold shown by a solid line α in FIG. 7. The deviation threshold is dependent on the vehicle speed. As shown in FIG. 7, the deviation threshold decreases monotonically as the vehicle speed increases.

When it is judged that the detection of the neutral steering position is not yet finished after the turn-on of the ignition switch 17, the braking force calculating section 40 proceeds to a step 43. At the step 43, the braking force calculating section 40 narrows the yaw rate control region by shifting the deviation threshold, i.e., the boundary of the yaw rate control region, from the solid line α to a broken line β. Then, at a step 44, the target braking force calculating section 40 decreases the yaw rate control gain.

Then, at the step 42, the target braking force calculating section 40 determines the target braking force of each wheel to reduce the deviation of the actual yaw rate from the target yaw rate with the control gain decreased at the step 44 when the yaw rate deviation is within the yaw rate control region over the deviation threshold shown by the broken line β extending above the line a substantially in parallel to the line α.

The behavior controller 10 sends, to the brake actuator 5 shown in FIGS. 1 and 2, the control signal to achieve the thus-calculated target braking force of each wheel. In response to the control signal, the brake actuator 5 produces a difference in the braking force between the left and right wheels, and reduces the deviation of the actual yaw rate from the target yaw rate.

This behavior control system controls the vehicle behavior in accordance with the estimated steering angle of the step 23 during an initial period from turn-on of the ignition switch 17 to detection of the neutral steering position during which the system cannot calculate the sensed steering angle. Therefore, the control system can start the behavior control immediately after a turn-on of the ignition switch 17, before the vehicle is brought to the straight ahead neutral position. The control system provides a satisfactory control performance without delay of the behavior control. The use of the estimated steering angle in place of the sensed steering angle during the initial period is effective in eliminating a delay in response and preventing undesired hunting in the behavior control.

In the example of FIG. 4, the system estimates the steering angle by addition of the last steering angle obtained at the last turn-off of the ignition switch 17 and stored in the memory, and the after-on steering angular displacement measured after the most recent turn-on of the ignition switch 17. The estimation of this example is reliable and accurate.

In the example shown in FIG. 5, the control system modifies the behavior control characteristic so as to restrain the yaw rate control by narrowing the control region and/or decreasing the control gain. This modification of the control characteristic is further effective for prevention of hunting.

Figure 6:
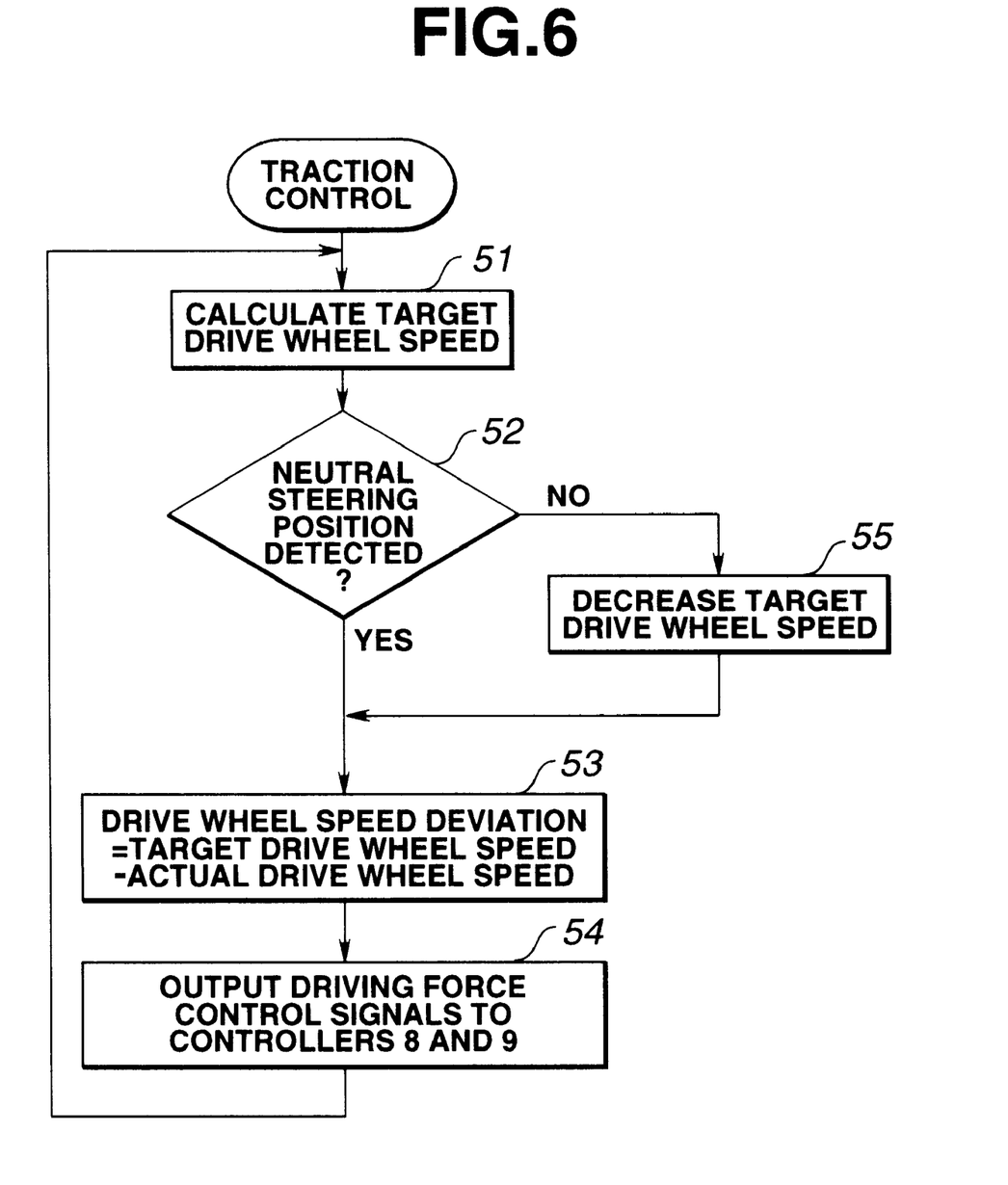
FIG. 6 is a flowchart showing a traction control procedure performed by a behavior controller shown in FIG. 1.

The behavior controller 10 in the example of FIG. 1 performs the traction control in accordance with the input information as shown in FIG. 6. This traction control does not require the steering angle as an input information item.

At a step 51 of FIG. 6, the behavior controller 10 determines a vehicle body speed from the signals of the front wheel speed sensors 11L and 11R for the non-drive front wheels 1L and 1R, and further determines, from the vehicle body speed, a target drive wheel speed to achieve an ideal slip rate for obtaining a maximum friction coefficient.

At a step 52, the behavior controller 10 performs a judging operation substantially identical to the step 21 of FIG. 3. That is, the behavior controller 10 determines whether the detection of the neutral position is complete by checking whether the neutral detection signal is already received after a turn-on of the ignition switch 17.

When the neutral steering position is already detected after the turn-on of the ignition switch 17, the behavior controller 10 performs the traction control at steps 53 and 54 by using the target drive wheel speed obtained at the step 51 without modification.

When, however, the neutral steering position is not yet detected after the turn-on of the ignition switch 17, the behavior controller 10 proceeds from the step 52 to a step 55, and decreases the target drive wheel speed at the step 55. For example, the behavior controller 10 decreases the target drive wheel speed by multiplying the target drive wheel speed determined at the step 51 by 0.8.

At the step 53, the behavior controller 10 calculates a drive wheel speed deviation by subtracting the sensed actual drive wheel speed from the target drive wheel speed determined at the steps 51 or 55 with or without the modification of the step 55.

Then, at the step 54, the behavior controller 10 produces the control signals representing the driving force required to reduce the drive wheel speed deviation to zero, and performs the traction control to prevent the drive wheel slip of the drive wheels 2L and 2R by closing the sub throttle valve 7 by sending the control signal to the throttle controller 8, and by increasing the amount of the fuel cutoff by sending the control signal to the engine controller 9.

During the initial period during which the neutral steering position is not yet detected after a turn-on of the ignition switch 17, and the desired yaw rate is calculated based on the estimated steering angle, the behavior controller 10 modifies the control characteristic of the traction control making no use of the steering angle as input information, in such a direction as to increase the likelihood of start of the traction control and to increase the stability of the vehicle. The increase of the vehicle stability decreases the need for the yaw rate control of FIGS. 2–5, and thereby promotes the above-mentioned effect. It is optional to decrease the target slip rate instead of decreasing the target drive wheel speed.

The control gain may be a proportional gain, for example, or may be at least one of proportional gain, integral gain and derivative gain, or may be some other control gain.

What is claimed is:

1. A control system for controlling behavior of a vehicle in accordance with a deviation of a sensed motion variable indicative of the behavior of the vehicle, from a target motion variable determined from a sensed steering angle with respect to a neutral steering position of a steering wheel, the control system comprising:

a control section for determining the target motion variable from an estimated steering angle in place of the sensed steering angle when the neutral steering position is not detected, and determination of the sensed steering angle based on the neutral position is not feasible.

2. The control system as claimed in claim 1 wherein the control section is configured to determine the estimated steering angle by addition of a stored last steering angle determined at a time of a turn-off of an ignition switch and a steering amount representing an angular displacement of the steering wheel measured after a turn-on of the ignition switch.

3. The control system as claimed in claim 1 wherein the control section is configured to modify a vehicle behavior control characteristic in a direction to decrease a control magnitude when the target motion variable is determined in accordance with the estimated steering angle.

4. The control system as claimed in claim 3 wherein the control section is configured to modify the vehicle behavior control characteristic by narrowing a vehicle behavior control region, so that the vehicle behavior control region is narrower when the target motion variable is determined in accordance with the estimated steering angle than when the target motion variable is determined in accordance with the sensed steering angle.

5. The control system as claimed in claim 3 wherein the control section is configured to modify the vehicle behavior control characteristic by decreasing a behavior control gain, so that the behavior control gain is smaller when the target motion variable is determined in accordance with the estimated steering angle than when the target motion variable is determined in accordance with the sensed steering angle.

6. The control system as claimed in claim 3 wherein the control section is configured to modify the vehicle behavior control characteristic by narrowing a vehicle behavior control region and simultaneously decreasing a vehicle behavior control gain.

7. The control system as claimed in claim 1 wherein the control section is configured to modify a control characteristic of a second vehicle control which does not use the steering angle of the steering wheel as input information, in a direction to increase a vehicle stability while the target motion variable is determined in accordance with the estimated steering angle instead of the sensed steering angle.

8. A vehicle control system comprising:

an output section for controlling behavior of a vehicle in response to a behavior control signal;

an input section for collecting input information on an operating condition of the vehicle, the input section sensing a straight ahead neutral steering position and a steering amount of a steering system of the vehicle; and a control section for controlling the behavior of the vehicle by producing the control signal in accordance with an actual steering angle determined from the steering amount and the neutral position, and for replacing the actual steering angle by an estimated steering angle when the neutral steering position is not detected.

9. The vehicle control system as claimed in claim 8 wherein the input section comprises a vehicle behavior sensor for sensing an actual motion variable of the vehicle and producing an actual behavior signal representing the actual motion variable and a steering angle sensor for producing a neutral detection signal representing the neutral position of the steering system, and a steering amount signal representing the steering amount of the steering system, and the control section determines the estimated steering angle in accordance with the input information without regard to the neutral detection signal, further determines a target motion variable in accordance with an effective steering angle and producing the behavior control signal representing a control magnitude determined from a deviation of the actual motion variable from the target motion variable according to a control characteristic, the control section normally employing as the effective steering angle the actual steering angle determined from the neutral detection signal and the steering amount signal, and employing as the effective steering angle the estimated steering angle instead of the actual steering angle when the neutral detection signal is not received from the input section from a turn-on of the control system.

10. The vehicle control system as claimed in claim 9 wherein the control section is configured to store the actual steering angle as a last steering angle when a prime mover of the vehicle is turned off, to determine the estimated steering angle from the last steering angle and the steering amount signal when the prime mover is turned on, and to employ the estimated steering angle as the effective steering angle from a turn-on of the prime mover to receipt of the neutral detection signal.

11. The vehicle control system as claimed in claim 9 wherein the control section is configured to modify the control characteristic in a direction to decrease the control magnitude when the estimated steering angle is substituted for the actual steering angle.

12. The vehicle control system as claimed in claim 11 wherein the control section is configured to modify the control characteristic by performing at least one of a first modifying operation for increasing a control threshold which is a minimum level of the deviation needed for allowing a behavior control based on the deviation, and a second modifying operation for decreasing a control gain for determining the control magnitude from the deviation.

13. The vehicle control system as claimed in claim 11 wherein the output section comprises a first actuating system for varying a first manipulated variable to control the behavior of the vehicle in response to the behavior control signal, and a second actuating system for varying a second manipulated variable to improve a vehicle stability in response to a second control signal, and the control section is configured to produce the second control signal in accordance with the input information without regard to the steering angle, and modify a control characteristic of the second control signal when the estimated steering angle is substituted for the actual steering angle.

14. The vehicle control system as claimed in claim 13 wherein the second actuating system comprises an actuator for varying the second manipulated variable for a traction control of the vehicle, and the control section is configured to modify the control characteristic of the second control signal in a direction to reduce an output torque of the prime mover.

15. The vehicle control system as claimed in claim 13 wherein the control section controls the behavior of the vehicle by producing the behavior control signal according to a normal control characteristic for determining the control magnitude from the deviation when the actual steering angle is employed as the effective steering angle, and a modified control characteristic when the estimated steering angle is employed as the effective steering angle, the control magnitude determined according to the modified control characteristic is smaller than the control magnitude according to the normal control characteristic at least in a predetermined range of the deviation.

* * * * *